Jan. 6, 1931.   E. D. McMAHON   1,787,753
TRACTION ATTACHMENT FOR VEHICLE WHEELS
Filed Dec. 20, 1927   2 Sheets-Sheet 1

Inventor
E. D. McMahon,

By Clarence A. O'Brien
Attorney

Patented Jan. 6, 1931

1,787,753

UNITED STATES PATENT OFFICE

EUGENE D. McMAHON, OF BEAUMONT, TEXAS

TRACTION ATTACHMENT FOR VEHICLE WHEELS

Application filed December 20, 1927. Serial No. 241,331.

The present invention relates to a traction attachment for vehicle wheels adapted to be removably carried thereon and comprising a plurality of thin sections providing an increased area for the tread of the wheel whereby to enable the vehicle to travel upon soft ground without becoming embedded therein.

A further object of the invention is to provide a series of cleats upon each of the traction sections and constituting a traction encasing element for the wheel while travelling through mud or other relatively soft ground.

Another object is to provide a double support for the traction section, one of said supports being provided by the tire of the wheel and the other support connecting the outer flange of the traction section with the hub of the wheel, said latter support including the yieldable connection between the traction section and the hub whereby to provide a resilient mounting for the frame.

Another object is to provide an attachment of this character of simple and practical construction which is strong and durable, efficient and reliable in performance, adapted to be easily and quickly mounted and demounted in position upon the wheel, relatively inexpensive to manufacture and otherwise well adapted for the purpose for which the same is intended.

Figure 1:
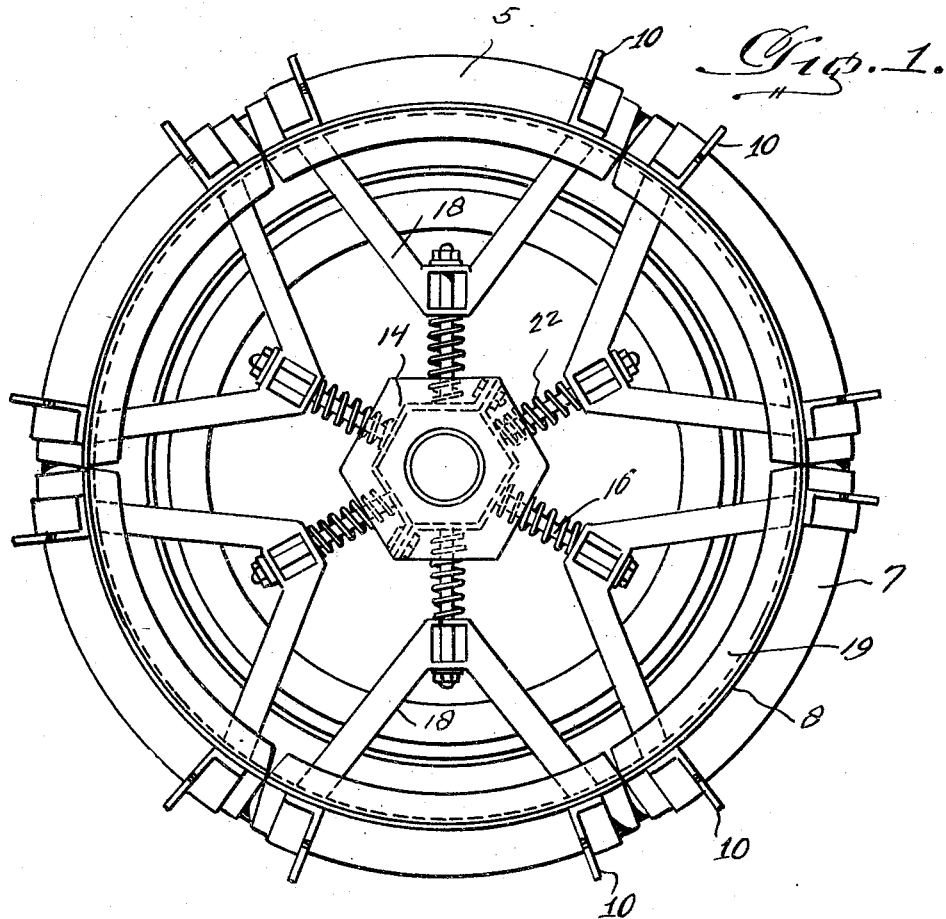
Figure 3:
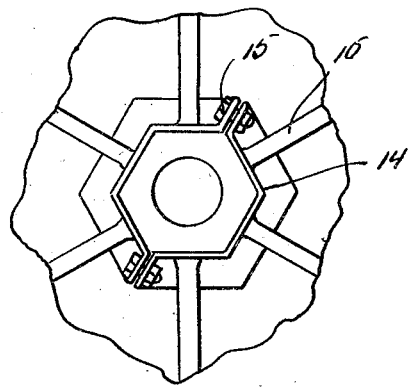
Figure 2:
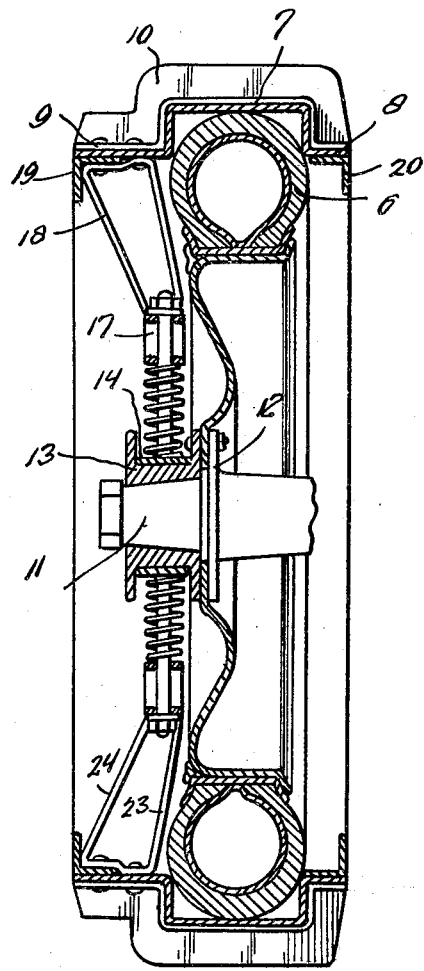
Figure 4:
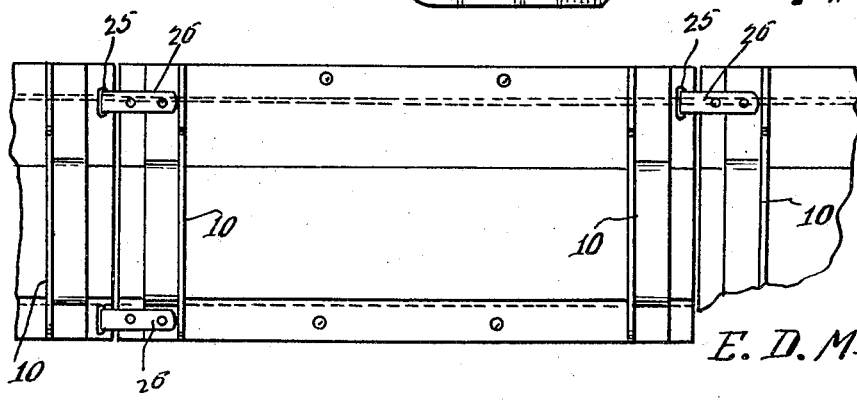

Other objects and advantages reside in the special construction and combination of the various elements comprising the invention, reference being had to the accompanying drawings forming a part hereof, wherein:

Figure 1 is a side elevational view of a wheel showing the attachment in assembled position thereon, Figure 2 is a vertical sectional view therethrough, Figure 3 is a detail of the hub forming a support for the spoke to which the outer flange of the traction sections are attached, and Figure 4 is a plan view of one of the traction sections.

Referring now to the drawings in detail, the invention comprises a plurality of traction sections indicated at 5 of an arcuate formation conforming with the tread of a vehicle tire 6, upon which the sections are arranged, said sections being angular in cross section as shown in Figure 2, providing a tread surface 7 for the section of a width substantially equal to the diameter of the tire, the sides of the section terminating in flanges 8 and 9 respectively.

The flange 8 is disposed inwardly with respect to the wheel whereas the flange 9 is disposed oppositely on the outer edge of the wheel and is of a relatively increased width over the flange 8. Upon the outer surface of each of the traction sections is mounted a plurality of cleats 10, preferably constructed of angle iron with the base portion thereof riveted or otherwise secured to the traction section and extending throughout the width of the section.

A hub extension 11 is mounted on the hub 12 of the wheel, the hub providing a support for a flanged collar 13 having its outer periphery of a hexagonal formation, the channel between the flanges of the collar providing a seat for a complementary shaped axle clamp 14, formed of a pair of sections as illustrated in Figures 1 and 3 of the drawing, the ends of said section being connected by means of bolts 15 or the like. Upon each of the angular surfaces of the clamp 14 extend relatively short spokes 16 disposed radially with respect to the hub with the outer end of each of said spokes slidably inserted through the converging end 17 of a V-shaped support 18. The arms of the V-shaped support extend diagonally from the outer end of the spoke 16 toward the periphery of the wheel and are disposed within the flange 9 of the adjacent traction section 5, being secured thereto by means of rivets, bolts or suitable fasteners. Between the support 18 and the flange 9 is interposed one end of a section of angle iron 19, arcuate shaped in conformity with the flange and with its outer edge disposed outwardly with respect to the support 18 and extending in a direction toward the hub substantially in the form of an apron. At the underside of the inner flange 8 are also secured similar angle iron sections 20. Mounted upon each of the spokes is a coil spring 22 having its opposite end yieldably compressed between the clamp 14 and the inner end of the V-shaped support 8.

As more clearly illustrated in Figure 2 of the drawings each of the arms of the supports 18 may be formed of inner and outer spaced bars 23 and 24 connected together at their opposite ends. The construction of the arms in this manner has its advantages in that the weight thereof is materially reduced and enables the inner and outer edges of the flange 9 to be suitably supported without providing any broad surface for engagement with mud or other loose material over which the vehicle may be standing and thus prevent an accumulation of mud thereupon.

At one end of each of the tractor sections 5, preferably in the flanges 8 and 9, are formed slotted openings 25 adapted to receive the hooked ends of latch members 26 carried on the adjacent end of the adjoining traction section. By providing a fastener of this character the adjacent ends of each traction section are firmly secured to each other.

It is apparent from the foregoing explanation that the device may be easily and quickly mounted and demounted in operative position upon a vehicle wheel without necessitating the removal of the wheel from the vehicle and when assembled in position in a manner as shown in Figure 1 of the drawings is admirably adapted to prevent the sinking of the tread of the wheel into soft ground over which the vehicle may be passing and furthermore by providing the cleats 10 upon each of the sections, suitable means is afforded for increasing the traction of the wheel.

It is obvious that the invention is susceptible of various changes and modifications, without departing from the spirit or scope of the invention or sacrificing any of its advantages, and I accordingly claim all such forms of the device to which I am entitled.

Having thus described my invention, what I claim as new is:

A traction attachment for wheels of the character described comprising a series of channeled tread sections for the reception of the tread portion of a vehicle tire, outwardly extending flanges on the longitudinal edges of the tread section, co-acting means on the flanges for shiftably connecting the adjacent ends of the sections together, and means for resiliently supporting the longitudinal flanges on the hub of the wheel comprising a polygonal collar mounted on said hub having peripheral flanges on its opposite ends, a sectional polygonal clamp detachably mounted on the collar intermediate the flanges, radially extending guide spokes mounted on each of the clamp sections, upwardly diverging supporting arms slidably mounted on the guide spokes, and connected at their upper ends to the opposite end portions of the outwardly extending flanges, and compressible springs between the lower ends of the arms and the clamp sections and mounted on the guide spokes in a manner to urge the arms outwardly.

In testimony whereof I affix my signature.

EUGENE D. McMAHON.